(12) United States Patent
Nikolic et al.

(10) Patent No.: US 9,065,859 B1
(45) Date of Patent: *Jun. 23, 2015

(54) SERVER SIDE DISAMBIGUATION OF AMBIGUOUS STATISTICS

(75) Inventors: Ognjen Nikolic, San Francisco, CA (US); Sagnik Nandy, Los Gatos, CA (US); Japjit Tulsi, Los Altos, CA (US); Elizabeth L. Liebert, Honolulu, HI (US)

(73) Assignee: Google Inc., Mountain View, CA (US)

( * ) Notice: Subject to any disclaimer, the term of this patent is extended or adjusted under 35 U.S.C. 154(b) by 727 days.

This patent is subject to a terminal disclaimer.

(21) Appl. No.: 13/371,641

(22) Filed: Feb. 13, 2012

Related U.S. Application Data

(63) Continuation of application No. 12/429,834, filed on Apr. 24, 2009, now Pat. No. 8,255,523.

(51) Int. Cl.
*G06F 15/173* (2006.01)
*H04L 29/08* (2006.01)
*G06F 17/30* (2006.01)

(52) U.S. Cl.
CPC .......... *H04L 67/22* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 5,951,643 A | 9/1999 | Shelton et al. | |
| 6,601,100 B2 | 7/2003 | Lee et al. | |
| 7,085,682 B1 * | 8/2006 | Heller et al. | 702/186 |
| 7,389,343 B2 * | 6/2008 | Busch et al. | 709/224 |
| 7,600,020 B2 * | 10/2009 | Busch et al. | 709/224 |
| 7,792,843 B2 * | 9/2010 | Iverson | 707/751 |
| 8,127,000 B2 * | 2/2012 | Wenig et al. | 709/224 |
| 8,214,272 B2 * | 7/2012 | Glassman et al. | 705/35 |
| 2008/0086558 A1 * | 4/2008 | Bahadori et al. | 709/224 |
| 2008/0262920 A1 * | 10/2008 | O'Neill et al. | 705/14 |
| 2010/0262498 A1 * | 10/2010 | Nolet et al. | 705/14.71 |
| 2011/0258049 A1 * | 10/2011 | Ramer et al. | 705/14.66 |

FOREIGN PATENT DOCUMENTS

EP          2056571 A2 *   5/2009

* cited by examiner

*Primary Examiner* — Jeffrey R Swearingen
(74) *Attorney, Agent, or Firm* — Fish & Richardson P.C.

(57) ABSTRACT

Tracking data communications are received for single properties that include ambiguous event statistics. The event statistics are disambiguated by an analytics processing system by identifying account and visitor identifier pairs from account identifiers and visitor identifiers in the tracking data communications. For each account and visitor identifier pair, ambiguous event statistics are ordered by the corresponding event times and disambiguated.

25 Claims, 7 Drawing Sheets

| Account ID | Visitor ID | Referrer | Campaign | First VT | Last VT | Num Visits | Event(s) |
|---|---|---|---|---|---|---|---|
| 4 | 37 | R1 | C1 | T1 | T1 | 1 | <data> |
| 3 | 37 | R2 | C2 | T1 | T2 | 2 | <data> |
| 4 | 37 | Property | C2 | T1 | T3 | 3 | <data> |
| 3 | 37 | Direct | None | T1 | T4 | 4 | <data> |
| 3 | 37 | Property | None | T1 | T5 | 5 | <data> |
| 4 | 37 | R3 | None | T1 | T6 | 6 | <data> |

| Account ID | Visitor ID | Session No. | Referrer | Campaign | First VT | Last VT | Num Visits | Event(s) |
|---|---|---|---|---|---|---|---|---|
| 3 | 37 | 1 | R2 | C2 | T2 | T2 | 1 | <data> |
| 3 | 37 | 1 | R2 | C2 | T2 | T4 | 2 | <data> |
| 3 | 37 | 1 | R2 | C2 | T2 | T5 | 3 | <data> |
| 4 | 37 | 1 | R1 | C1 | T1 | T1 | 1 | <data> |
| 4 | 37 | 1 | R1 | C1 | T1 | T3 | 2 | <data> |
| 4 | 37 | 2 | R3 | None | T1 | T6 | 3 | <data> |

902

| Account ID | Visitor ID | Referrer | Campaign | First VT | Last VT | Num Visits | Event(s) |
|---|---|---|---|---|---|---|---|
| 4 | 37 | R1 | C1 | T1 | T1 | 1 | <data> |
| 3 | 37 | R2 | C2 | T2 | T2 | 1 | <data> |
| 4 | 37 | Property | C2 | T3 | T3 | 1 | <data> |
| 3 | 37 | Direct | None | T4 | T4 | 1 | <data> |
| 3 | 37 | Property | None | T5 | T5 | 1 | <data> |
| 4 | 37 | R3 | None | T6 | T6 | 1 | <data> |

904

| Account ID | Visitor ID | Session No. | Referrer | Campaign | First VT | Last VT | Num Visits | Event(s) |
|---|---|---|---|---|---|---|---|---|
| 3 | 37 | 1 | R2 | C2 | T2 | T2 | 1 | <data> |
| 3 | 37 | 1 | R2 | C2 | T2 | T4 | 2 | <data> |
| 3 | 37 | 1 | R2 | C2 | T2 | T5 | 3 | <data> |
| 4 | 37 | 1 | R1 | C1 | T1 | T1 | 1 | <data> |
| 4 | 37 | 1 | R1 | C1 | T1 | T3 | 2 | <data> |
| 4 | 37 | 2 | R3 | None | T1 | T6 | 3 | <data> |

SERVER SIDE DISAMBIGUATION OF AMBIGUOUS STATISTICS

CROSS-REFERENCE TO RELATED APPLICATIONS

This application is a continuation application of and claims priority to U.S. application Ser. No. 12/429,834, filed on Apr. 24, 2009, and which matured into U.S. Pat. No. 8,255,523 on Aug. 28, 2012, the disclosure of which is incorporated herein by reference.

BACKGROUND

This disclosure relates to processing network traffic statistics.

A publisher is an entity that owns and/or manages a web site. Using analytical services offered by third parties, the publisher can monitor analytical data related to user visits and links to the web site. Example analytical data includes data related to domains and/or web sites from which visitors arrived and to which the visitors departed; traffic patterns, e.g., navigation clicks of visitors within the publisher's web site; visitor actions, e.g., purchases, filling out of forms, etc., and other actions that a visitor may take in relation to the publisher's web site. The analysis of such analytical data can inform the publisher of how the visitors were referred to the publisher's web site, whether an advertising campaign resulted in the referral, and how the visitors interacted with the publisher's web site. With this understanding, the publisher can implement changes to increase revenue generation and/or improve the visitor experience. For example, a publisher can focus marketing resources on advertising campaigns, review referrals from other web sites, identify other publishers as potential partners for cross-linking, and so on.

One example analytical system that provides analytical tools that facilitate the collection and analysis of such analytical data is provided by Google™ Analytics, available from Google, Inc., in Mountain View, Calif. To use such systems, a publisher typically provides tracking request code embedded in its web pages. Typically the tracking request code is a snippet of JavaScript™ code that the publisher adds onto every page of their web site for which traffic is to be tracked. When the page is requested by a user device, the tracking request code determines if the tracking code is stored in a browser cache on the user device. If the tracking code is not stored in the browser cache, the tracking request code requests and downloads tracking code from an analytics server. The tracking code is then stored in the browser cache on the user device and executed.

The tracking code collects visitor data and sends it back to the analytics server in the form of a tracking data communication for processing. The tracking data communication includes an account identifier that identifies an analytics account of the publisher, a visitor identifier that identifies the visitor, and event statistics, such as whether the visitor has been to the web site before, the timestamp of the current visit, referrer data identifying the referrer site, campaign data identifying the advertising campaign the visitor came from, and other event statistics.

In addition to providing tracking data communications to the analytics server, the tracking code sets one or more corresponding cookies in the visitor's browser. The cookies are used to store information related to the tracking data communications, such as the number of times the visitor has been to the web site, the time of the current visit, referrer data, and campaign data.

While the use of cookies works well for tracking information for a property such as a web site, reliance on cookies can, in some situations, result in ambiguous event statistics. Ambiguous event statistics are event statistics that do not quantify the actual states of events, and are caused by the coupling of event statistics for sub-properties within a property, or by stateless event statistics.

In the context of a web site, a property and a sub-property are any two resource environments that share a common cookie. For example, a property can be a web site, and a sub-property can be one or more web pages within the web site. Many properties include sub-properties that are sponsored, maintained or hosted in part by entities other than the web site publisher. For example, a video sharing web site may include sub-properties that are sponsored by third parties. Examples of such sub-properties include pages for particular networks, pages for news organizations, and pages for particular companies, to name just a few. These sub-properties are usually located on web pages hosted by a web server of the property. For example, the web site YouTube includes brand channels for many networks, film distributors, and news organizations, and each brand channel is maintained, in part, by its corresponding sponsor.

Often these third parties desire to monitor the analytical data for their respective pages. However, as cookies are persisted on a domain basis, event statistics for several sub-properties can be coupled. Coupled event statistics occur when event statistics for a sub-property hosted at a web site property are coupled, e.g., aggregated at the client side, with event statistics for another sub-property hosted at that web site. For example, a user device may request, in succession, pages for three different sup-properties hosted at a particular property. With each page request, the cookies that are persisted for the property domain are updated relative to previous page requests. As a result, for the third page request, the event statistics indicate that the visitor has visited the page three times, as three page requests for that domain have been generated. However, with respect to each sub-property, the visitor has only visited each page once.

In the context of a web page, a property can be the web page and the sub-property can be an application embedded within the web page. For example, a web page may include embedded applications, or "gadgets," for which an operating environment is rendered in the web page. Such gadgets can include stock reporting applications, weather reporting applications, and e-mail reporting applications. These gadgets may be hosted by other web sites. However, most web browsers prohibit cross-domain cookies due to security and privacy concerns. Thus, gadgets and rich media advertisements may have inaccurate tracking data as well due to the coupling of event statistics.

Another example of ambiguous event statistics is stateless statistics. Stateless event statistics are event statistics that are independent of prior event statistics in prior tracking data communications. Stateless event statistics often occur in cookieless environments. A cookieless environment is an environment in which cookies cannot be persisted or used, such as when a user disables the use of cookies in a browser, or such as may exist in many mobile devices. In such environments, the event statistics included in the tracking data do not reflect the occurrence of earlier events. For example, the event statistics may specify that each page request for a visitor is the first request for that visitor, as there is no client-side storage of prior event statistics.

SUMMARY

In general, one aspect of the subject matter described in this specification can be embodied in methods that include the actions of receiving at an analytics data processing apparatus tracking data communications for a single property, the single property including a plurality of sub-properties, each sub-property being one or more respective web pages associated with a respective account identifier identifying a tracking account, each respective account identifier being different from each other respective account identifier, and each tracking data communication including: an account identifier identifying a tracking account, a visitor identifier identifying a visitor to a sub-property associated with the tracking account, an event time, and one or more coupled event statistics, the coupled event statistics being event statistics for at least two of the sub-properties aggregated at a single property level that corresponds to the single property and that do not respectively quantify actions taken at the respective sub-properties; identifying at the analytics data processing apparatus account identifier and visitor identifier pairs from the account identifiers and visitor identifiers in the tracking data communications; and for each account identifier and visitor identifier pair: ordering at the analytics data processing apparatus the coupled event statistics by the corresponding event times in the tracking data communications corresponding to the account identifier and visitor identifier pair, and deriving decoupled event statistics from the coupled event statistics ordered by the event times, the decoupled event statistics including statistics for only the sub-property associated with the account identifier. Other embodiments of this aspect include corresponding systems, apparatus, and computer program products.

Another aspect of the subject matter described in this specification can be embodied in methods that include the actions of receiving at an analytics data processing apparatus tracking data communications for properties associated respective account identifiers identifying tracking accounts, each property being one or more respective web pages, each respective account identifier being different from each other respective account identifier, and each tracking data communication including: an account identifier identifying a tracking account, a visitor identifier identifying a visitor to the property associated with the tracking account, an event time, and one or more stateless event statistics, the stateless event statistics being event statistics that are independent of prior event statistics in prior tracking data communications; and wherein the independence of prior event statistics for each tracking data communication is established by a first visit time and a last visit time for each tracking data communication being equal; identifying at the analytics data processing apparatus account identifier and visitor identifier pairs from the account identifiers and visitor identifiers in the tracking data communications; and for each account identifier and visitor identifier pair: ordering at the analytics data processing apparatus the stateless event statistics by the corresponding event times in the tracking data communications corresponding to the account identifier and visitor identifier pair, and deriving state-dependent event statistics from the stateless event statistics ordered by the event times, the state-dependent event statistics including statistics for only the property associated with the account identifier. Other embodiments of this aspect include corresponding systems, apparatus, and computer program products.

Particular embodiments of the subject matter described in this specification can be implemented to realize one or more of the following advantages. Multiple tracking accounts can be tracked for a single domain property, and ambiguous event statistics due to the coupling of event statistics for each tracking account can be disambiguated to accurately quantify the actual state of events associated with each tracking account.

Furthermore, ambiguous event statistics occurring as a result of stateless environments can be disambiguated to accurately quantify the actual state of events associated with the tracking account.

The disambiguated event statistics are used by an analytics server to identify visitor sessions for properties and/or sub properties. By identifying sessions at the server side, the actual state of events can be derived in spite of client-side cookie collisions or a lack of client-side cookie support. Additionally, identifying sessions at the server-side does not require revisions to existing tracking code that is used to report tracking data communications to the analytics server.

Identification of sessions on the server-side also transforms user devices from state control, persistence environments to stateless, cookieless environments, thus eliminating client-side logic, persistence, and reliance on cookies.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION 1.0 Example Environment

Figure 1:
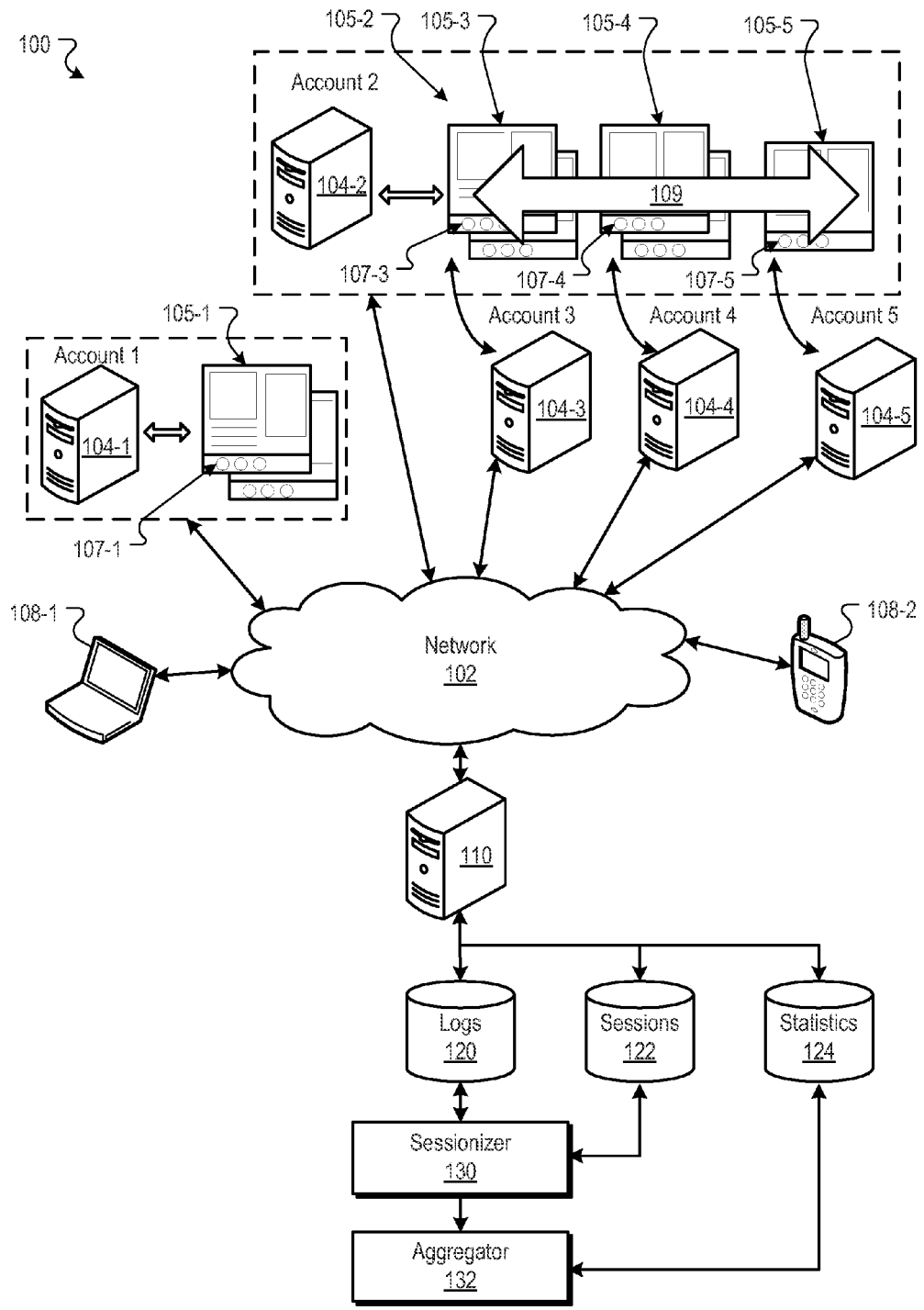
FIG. 1 is a block diagram of an example environment in which tracking data communications are reported and processed.

FIG. 1 is a block diagram of an example environment 100 in which tracking data communications are reported and processed. A computer network 102, such the Internet, or a combination of Internet and one or more wired and wireless networks, connects web sites 104-1-104-5, user devices 108-1 and 108-2, and an analytics system 110, such as data processing apparatus that includes a server or many networked servers. Although only five web sites and two user devices are shown, the online environment 100 may include many thousands of web sites and user devices.

A web site 104 is a one or more web page resource 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. For the purposes herein, the term "web page resource", or simply "web page", will be used to describe resources that are accessed through a web browser or similar type of application for display on a user device. Web pages can include HTML or XHTML data, multimedia data, e.g., flash video; images; audio; scripts; and other information and objects that can be presented and executed and/or interpreted in a browser. Web pages also can provide navigation to other web pages via hypertext links. The web pages are stored and retrieved from web servers that host the web page, and are typically requested and served from the web server using Hypertext Transfer Protocol (HTTP).

A user device, such as one of the devices 108-1 or 108-2, is an electronic device that is under control of a user and is capable of requesting and receiving resources over the network 102. Example user devices 108 include personal computers, e.g., user device 108-1, mobile communication devices, e.g., 108-2, and other devices that can send and receive data over the network 102. A user device 108 typically includes a user application, such as a web browser, to facilitate the sending and receiving of data over the network 102.

The publisher of the web site 104-1 has a tracking account, i.e., "Account 1", with which data regarding traffic directed to and from the web site 104-1 and events related to actions taken by visitors to the web site 104-1 are associated in the analytics system 110. Each of the web page 105-1 of the web site 104-1 that the publisher desires to track detailed statistics for visitor traffic has embedded within it the tracking request code described above. When one of the web pages 105-1 is rendered in a browser application on a user device 108, the tracking request code is executed and the browser cache is checked to determine if tracking code is stored in the cache. If tracking code is stored in the cache, then the tracking code is executed. Conversely, if the tracking code is not stored in the cache, then the tracking request code requests the tracking code from the analytics system 110. Upon receiving the tracking code from the analytics system 110, the user device 108 stores tracking code in the browser cache and executes the tracking code. In some implementations, the tracking request code can be configured to request the tracking code from the analytics system 110 each time a web page is loaded.

Execution of the tracking request code enables the user device 108 to provide tracking data communications to the analytics system 110. Example tracking data communication includes an account identifier identifying a tracking account, a visitor identifier identifying a visitor to the web page, an event time, and one or more event statistics. The account identifier is the tracking account number of the web site or web page.

The visitor identifier can, in some implementations, identify a particular user of the user device 108. In some implementations, the visitor information is anonymized for privacy protection. For example, the tracking code can be configured to report only an Internet protocol (IP) address of the user device 108, or can generate a unique random number that is associated with the IP address of the user device 108. Thus, tracking data for a particular user device are not otherwise associated with or identify a particular user. Other anonymization processes, such as hashing, encryption and obfuscation techniques, can also be used to ensure that visitor privacy is protected.

The event time, in some implementations, is a timestamp indicating the time at which the tracking data communication was sent to the analytics system 110. For example, a tracking data communication can be sent each time there is a page request generated by the user device 108. Accordingly, the event time will be the time at which the page request was generated at the user device 108.

Many different event statistics can be reported. For example, a web page can include data specifying which events are to be reported in tracking data communications. Typically the event statistics that are reported include referrer data identifying the referrer site, campaign data identifying the advertising campaign the visitor came from, the first times the visitor visited the web site, and the number of time the visitor has visited the web site.

Because HTTP is a stateless protocol, historical data related for the visitor is stored in a tracking cookie for the web site 104. For example, when one of the web page 105-1 is loaded on the user device 108-1, one or more tracking cookies 107-1 for the web site 104-1 are stored in the browser cache on the user device 108-1. The tracking code then stores historical data for that visitor for the web site 104 in the one or more tracking cookies 107-1 on the user device 108-1. Accordingly, the state of the events, such as the number of visits and the first time the user device 108-1 visited the web site 104-1, can be accurately reported to the analytics system 110.

However, if the user device 108-1 has been configured to disable the use of cookies, or if the user device does not support the use of cookies, such as the user device 108-2, which is a mobile device, then the event statistics that are reported are stateless event statistics, as described above. As the stateless event statistics do not take into account the occurrence of earlier events, the stateless event statistics can result in ambiguities.

The web site 104-2 also is associated with a tracking account, i.e., "Account 2", with which data regarding traffic directed to and from the web site 104-2 and events related to actions taken by visitors to the web site 104-2 are associated in the analytics data processing system 110. Each web page 105-2 that the publisher of web site 104-2 desires to track detailed statistics for visitor traffic has embedded within it the tracking request code described above. Additionally, the publisher of the web site 104-2 allows publishers of other web sites 104-3, 104-4 and 104-5 to maintain sponsored web pages 105-3, 105-4 and 105-5 on the web site 104-2. Each of the web sites 104-3, 104-4 and 104-5 also have corresponding accounts in the analytics system 110.

However, as the web pages 105-3, 105-4 and 105-5 are within the same domain of the web site 104-2 (i.e., each of the web pages is addressed by uniform resource locators that share the common domain name of the web site 104-2), the event statistics with respect to the web pages 105-3, 105-4 and 105-5 are coupled event statistics. Coupled event statistics occur when event statistics for a sub-property hosted at a host associated with a domain name are coupled, e.g., aggregated at the client side, with event statistics for another sub-property hosted at that host. As the tracking cookies 107-3, 107-4, and 107-5 are persisted on a domain basis, event statistics for several sup-properties are coupled, as represented by the solid arrow 109 indicating the coupling of event statistics across the web pages 105-3, 105-4 and 105-5.

A similar coupling of event statistics arises from third party applications and advertisements embedded in web pages, such as the case of embedded gadgets and rich media advertisements, as described above.

In both cases—third party web pages within a web site and third party applications and advertisements embedded in web pages—cookie collisions for cookies generated for the tracking code can occur, which causes coupling of the event statistics. The event statistics are coupled due to the sharing of a "cookie space" among the property and sub-properties. A cookie space is defined by all resources that cause a browser to store a cookie that is common to each of the resources. As a result, the tracking code persists events for different tracking accounts in the same set of cookies.

2.0 Disambiguation and Sessionization

To resolve these ambiguities, the analytics system 110 includes a sessionizer engine 130. The tracking data communications received by the analytics system 110 are stored in logs 120. The sessionizer 130 accesses the logs 120 and identifies account identifier and visitor identifier pairs from the account identifiers and visitor identifiers in the tracking data communications stored in the logs 120. Thereafter, for each identified account and visitor identifier pair, the sessionizer orders the ambiguous event statistics by their corresponding event times in the tracking data communications. Using these ordered event statistics for each account and visitor identifier pair, the sessionizer 130 disambiguates the event statistics so that the event statistics quantify actual states of events for the property or sub-properties (i.e., web page or web pages) associated with the account identifier. The disambiguated and sessionized data are stored in a sessions data store 122.

Figure 2:
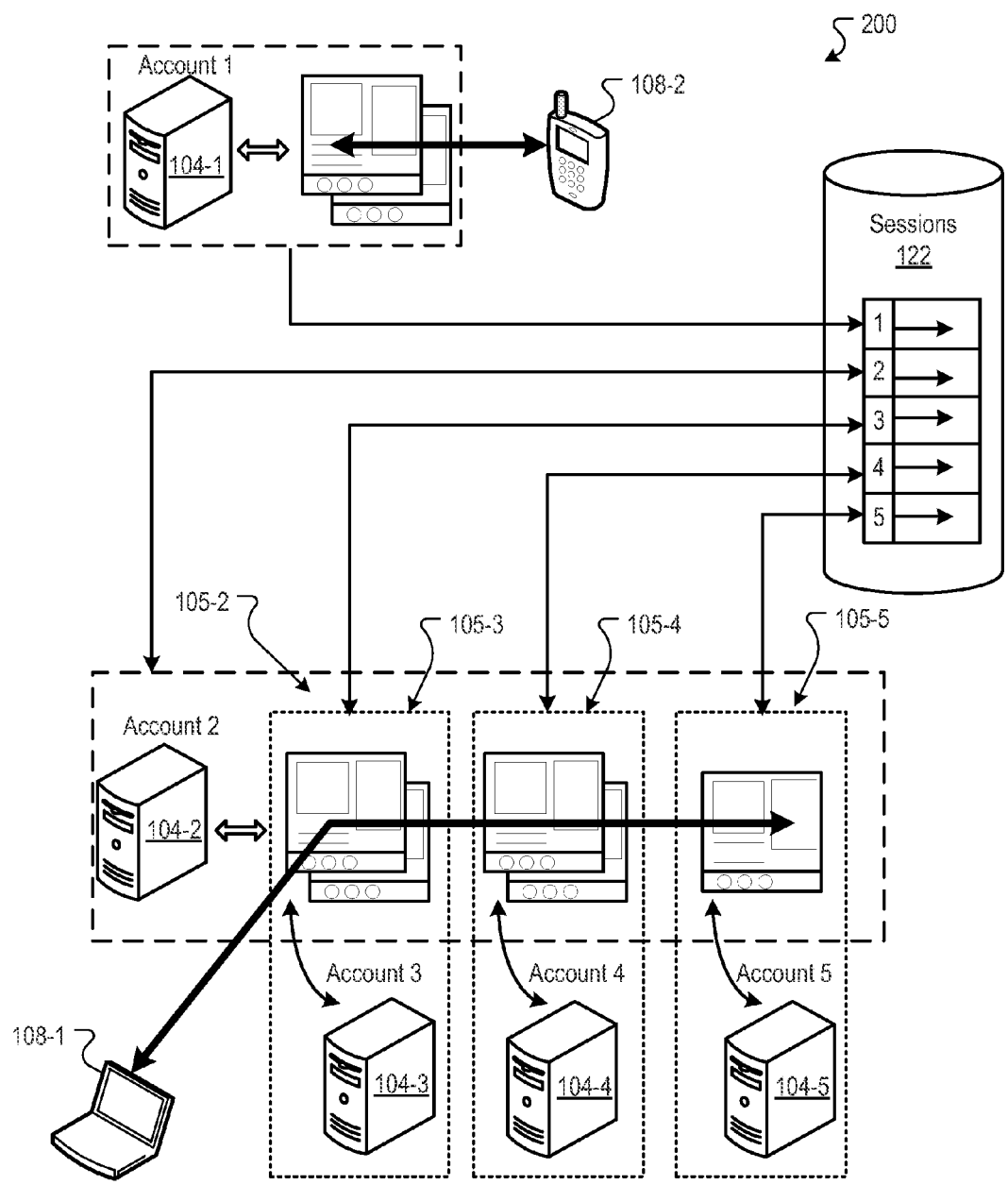
FIG. 2 is a block diagram of an example of server side sessionization of ambiguous event statistics.

The operation of the sessionizer 130 can be better understood with reference to FIG. 2, which is a block diagram 200 of an example of server side sessionization of ambiguous event statistics. The bold bidirectional arrow extending from the user device 108-1 across the web pages 105-3, 105-4 and 105-5 represent one visitor that visited each of those web pages during one or more sessions. Likewise, the bold bidirectional arrow extending from the user device 108-2 across the web pages 105-1 present one visitor that visited each of those web pages during one or more sessions. Because each page request for each web page results in a tracking data communication that includes a visitor identifier and account identifier, the tracking data communications for each corresponding account can be grouped according to their accounts and visitor identifier pair. Once grouped according to these pairs, the sessionizer 130 can disambiguate the event statistics and identify corresponding sessions.

As used herein, a session is a collection of events (page views, clicks, mouse events) performed by a visitor on a particular web site within a predefined time period. One example time period is 30 minutes. Other time periods can also be used, as can other types of session definitions. Examples of other session definitions include a maximum number of events, a maximum number of events within a predefined time period, or a contiguous collection of events for which no two subsequent events occur more than a predefined time apart, e.g., five minutes.

The aggregator 132 processes the disambiguated and sessionized data stored in the sessions data store 122 to generate aggregated event statistics for each account and visitor identifier pair. The aggregated event statistics are stored in the statistics data store 124 for access by account users.

Events stored in the statistics store 124 are typically presented in session/visit reports. Such reports are useful to web sites as they give the publishers insight into the number of visitors to their sites, loyalty for returning visitors, duration of visits, actions performed during their visit, campaign driving traffic to their sites, other sites resulting in a large number of referrals to their sites, and other useful analytics.

Figure 3:
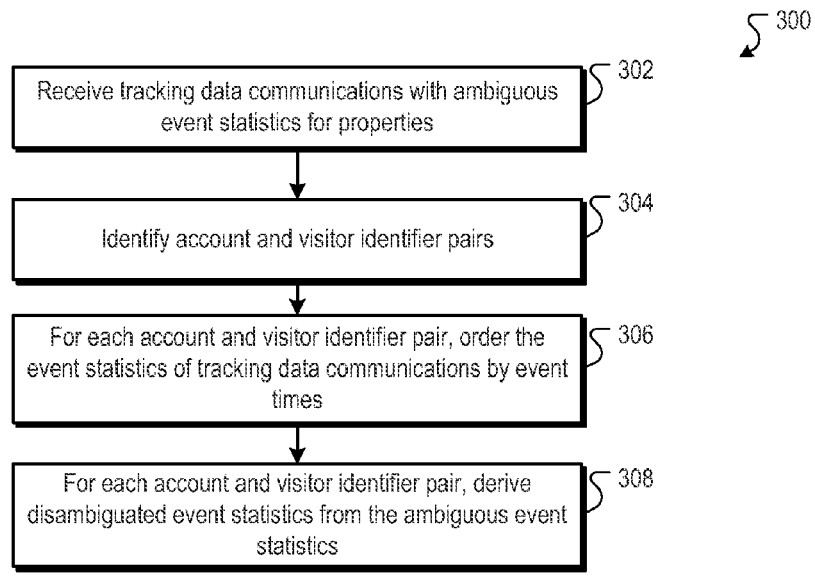
FIG. 3 is a flow diagram of an example process of disambiguating ambiguous event statistics.

FIG. 3 is a flow diagram of an example process 300 of disambiguating ambiguous event statistics. The process 300 is performed in the analytics data processing system 110 that includes a sessionizer engine 130.

Tracking data communications with ambiguous event statistics for properties are received (302). For example, tracking data communications that include stateless event statistics can be received for the web pages 105-1 of the web site 104-1. Alternatively, tracking data communications with coupled event statistics can be received for the sup-properties 105-3, 105-4, and 105-5 of the web site property of the web site 104-2.

Account and visitor identifier pairs are identified from the account identifiers and visitor identifiers in the tracking data communications (304), and for each account and visitor identifier pair, the tracking data communications are ordered by event times. For example, the sessionizer 130 groups all tracking data communications according to account and visitor identifier pairs. Each grouping of the tracking data communications are then ordered by their corresponding event times.

Disambiguated event statistics are derived from the ordered ambiguous event statistics for each account and visitor identifier pair (308). For example, coupled event statistics for each visitor and identifier pair are compared to other coupled event statistics for that visitor identifier pair to generate decoupled event statistics. These decoupled event statistics include statistics for only the sub property associated with the account identifier in the account and visitor identifier pair. For stateless event statistics, stateless event statistics related to a visitor and identifier pair are compared to other stateless event statistics for that visitor and account identifier pair to generate state dependent event statistics. In some implementations, visitor sessions can also be identified.

Example processes for disambiguating in sessionizing coupled event statistics and stateless event statistics are described below.

3.0 Disambiguation and Sessionization of Coupled Event Statistics

Figure 4:
FIG. 4 illustrates decoupled and sessionized event statistics derived from coupled event statistics.

FIG. 4 illustrates decoupled and sessionized event statistics derived from coupled event statistics. Table 402 include six rows of example data communications that were received in response to a unique visitor (i.e., a visitor or user device identified by the visitor identifier "37") to the web pages 105-3 and 105-4. The referrer column stores data that identify either the address of a web page that included a link that was selected to arrive at a web page, or data indicating that the user input the address of the web page directly. For the purposes of this description, the referrers R1, R2 and R3 are representative of URLs that are external to the web site 104-2, the referrer "Property" is representative of a web page located within the web site 104-2, and the referrer "Direct" represents a direct input of the URL of a web page.

Similarly, the Campaign column stores data that identify the campaign the visitor came from, e.g., if the user selected an advertisement to arrive at the web page, the data stored in a campaign column would identify the advertisement campaign and the advertisements selected.

The First VT column includes the time that the visitor first visited the web site 104-2, and the Last VT column includes the time that the tracking data communication was sent. The Num Visits column includes accumulative number of visits to the web site 104-2. Finally, the Events column includes other event statistics that are tracked by the tracking code and sent in the tracking data communications.

The tracking data communications stored in table 402 establish that the visitor took the following actions with respect to the web site 104-1. At time T1, the visitor selected an advertisement for campaign C1 on the web page address by the URL R1. The advertisement directed the visitor to one of the web pages 105-4, as indicated by the account ID value of 4. As this was the visitor's first visit to the web site 104-2, the tracking code created a cookie for the web site and stored the value of T1 as the first visit time.

Thereafter, the visitor left the web site 104-1. At the time T2, the visitor selected an advertisement for the campaign C2 on the web page address by the URL R2. The advertisement directed the visitor to one of the web pages 105-3, as indicated by the account ID value of 3.

While visiting the web page 105-3 at time T3, the user selected a link that refers to one of the web pages 105-4, as indicated by the referrer value of "Property." For example, the web site 104-2 may include an iFrame that has links to other sub-properties within the web site, and the user may have selected a link to one of the web pages 105-4.

At a later time T4, the visitor input the URL of one of the web pages 105-4, as indicated by the referrer value of "Direct," and at time T5, the visitor reloaded the web page.

Finally, at time T6, the visitor selected a link to one of the web pages 105-4 that was provided on the web page addressed by the URL R3, as indicated by the referrer data R3.

While the event statistics stored in table 402 are accurate with respect to the visitors actions taken at the web site 104-2, the event statistics are ambiguous with respect to the visitors actions taken at the respective sub-properties of the web pages 105-3 and 105-4.

To resolve this ambiguity for each respective tracking account, the sessionizer 130 orders the event statistics for each account identifier pair by the respective event times. Once the event statistics are ordered, the sessionizer 130 identifies visitor sessions and, optionally, applies an attribution model for proper attribution of referrer and campaigns.

As illustrated in table 404, the events statistics relating to the referrer data, the campaign data, the first visit time, and the number of visits are decoupled for each sub property, i.e., for each set of web pages 105-3 and 105-4.

To decouple the first visit times, the ordered event statistics for each account and visitor identifier pair are searched for the earliest tracking data communication received. The corresponding event time of this tracking data communication is used as the first visit time. For example, for the tracking data communications for the account and visitor identifier pair 3/37, the first event time in table 402 (i.e., the last visit time) is T2. Thus, this time is used for the first visit time for the account and visitor identifier pair 3/37.

To decouple the number of visits, the number of visits are reset and incremented for the ordered event statistics for each account and visitor identifier pair. In the example of FIG. 4, the visitor visited each respective sub-property 105-3 and 105-4 three times.

The sessionizer 130 can also partition the event statistics for each identifier pair into sessions. Table 404 includes an additional session column that identifies the number of sessions for each account and visitor identifier pair. As previously described, an example session criterion is any collection of events (e.g., page views, clicks, mouse events) performed by a visitor on a particular web site within a pre-defined time period (e.g., 30 minutes). For the first account and visitor identifier pair 3/37, the example event times T2, T4 and T5 are all within a 30-minute window as measured from time T2. Thus, the first three rows in table 404 constitute one session for the account and visitor identifier pair 3/37.

Conversely, for the second account and visitor identifier pair 4/37, only the two example event times T1 and T3 are within a 30-minute window as measured from time T1. Thus, the last event time T6 indicates the beginning of a new session. Accordingly, the event statistics for the account and visitor identifier pair 4/37 are grouped into separate sessions.

After the tracking data communications are processed, data identifying the sessions and representing the disambiguated event statistics are stored in the sessions store 122 and statistics store 124. Although shown as two separate stores, the stores can be implemented as one logical store distributed over multiple storage devices.

3.1 Processing of Subsequent and Latent Tracking Data Communications

In practice, the analytics system 110 processes millions of tracking data communications on a daily basis, and the tracking data communications are not received in a synchronous manner due to various network latencies. Accordingly, the sessionizer 130 can be configured to periodically reprocess tracking data communications at various times throughout the day. For example, if analytical data are processed for tracking data communications on a daily basis, the sessionizer 130 can be configured to process tracking data communications stored in the logs 120 at one or more intra-processing times during the day, and at one or more post processing times that occur after the daily period. For example, for a 24-hour analytics period, the sessionizer can process tracking data communications at six-hour intervals during the 24-hour analytics period, and at a six-hour interval after the 24-hour analytics period. Additional latent tracking data communications received six hours after the 24-hour analytics period can be ignored. Other processing periods and processing times can also be used.

In some implementations, the sessionizer 130 is configured to store the time that that tracking data communications were last processed and only process the tracking data communications that have event times later than the last processing time. For example, with respect to FIG. 4, assume the tracking data communications were processed at a time T7, and further assume that after time T7 two additional tracking data communications are received, a subsequent tracking data communication with an event time of T8, and a latent tracking data communication with an event time of T4.5. Only the tracking data communication with the event time of T8 is processed, i.e., the tracking data communications for time T1-T6 do not need to again be processed, and the latent tracking data communication is ignored. This implementation limits processing to only tracking data communications having event times that are later than the time at which the last processing of the tracking data communications occurred.

In other implementations, the sessionizer 130 is configured to store the time that that tracking data communications were last processed, and tag each tracking data communication with the time at which the tracking data communication was received by the analytics system 110, and processes only the tracking data communications that have been received since the time the tracking data communications were last processed. For example, continuing the same example with respect to FIG. 4, both the subsequent tracking data communication with an event time of T8 and the latent tracking data communication with an event time of T4.5 would be processed. This implementation limits processing to all tracking data communications that are received at times later than the time at which the last processing of the tracking data communications occurred.

3.2 Sessionization

Figure 5:
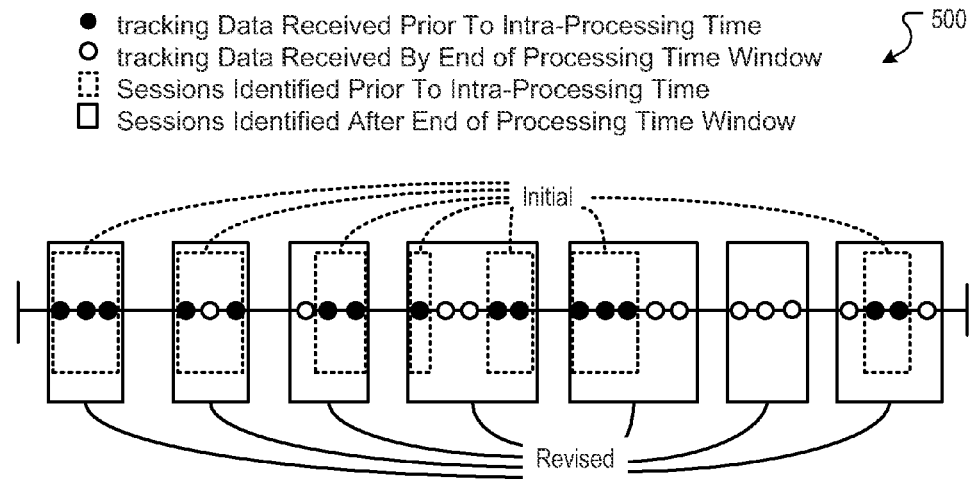
FIG. 5 is a block diagram illustrating the identification of sessions from disambiguated event statistics.

FIG. 5 is a block diagram 500 illustrating the identification of sessions from disambiguated event statistics. The block diagram 500 illustrates how the number of identified sessions can change due to the arrival of latent tracking data communications. The horizontal axis represents a portion of an analytics period, and each dot on the access represents event statistics corresponding to a time on the axis. The event statistics correspond to a single account and visitor identifier pair.

Prior to the occurrence of intra-processing time, tracking data communications stored in the logs 120 are processed and the sessionizer 130 identifies an initial set of seven sequential sessions, as indicated by the dashed session rectangles. After the intra-processing time, the tracking data communications are again processed and a revised set of seven sequential sessions are identified, as indicated by the solid session rectangles.

While the initial first session remain unchanged, the initial second session is revised to include an additional event that occurred between two existing events. The third initial session is revised to include a new first event. The fourth and fifth initial sessions are revised to be included in the revised fourth session, as two additional events are received that cause the events of the fourth and fifth initial sessions to be grouped into a single session. The initial sixth session is revised to include two additional terminal events. A new session is also identified due to the arrival of three latent event statistics that are not associated with any other sessions for the given session criteria. Finally, the seventh session is revised to include a new initial event and a new terminal event.

Figure 6:
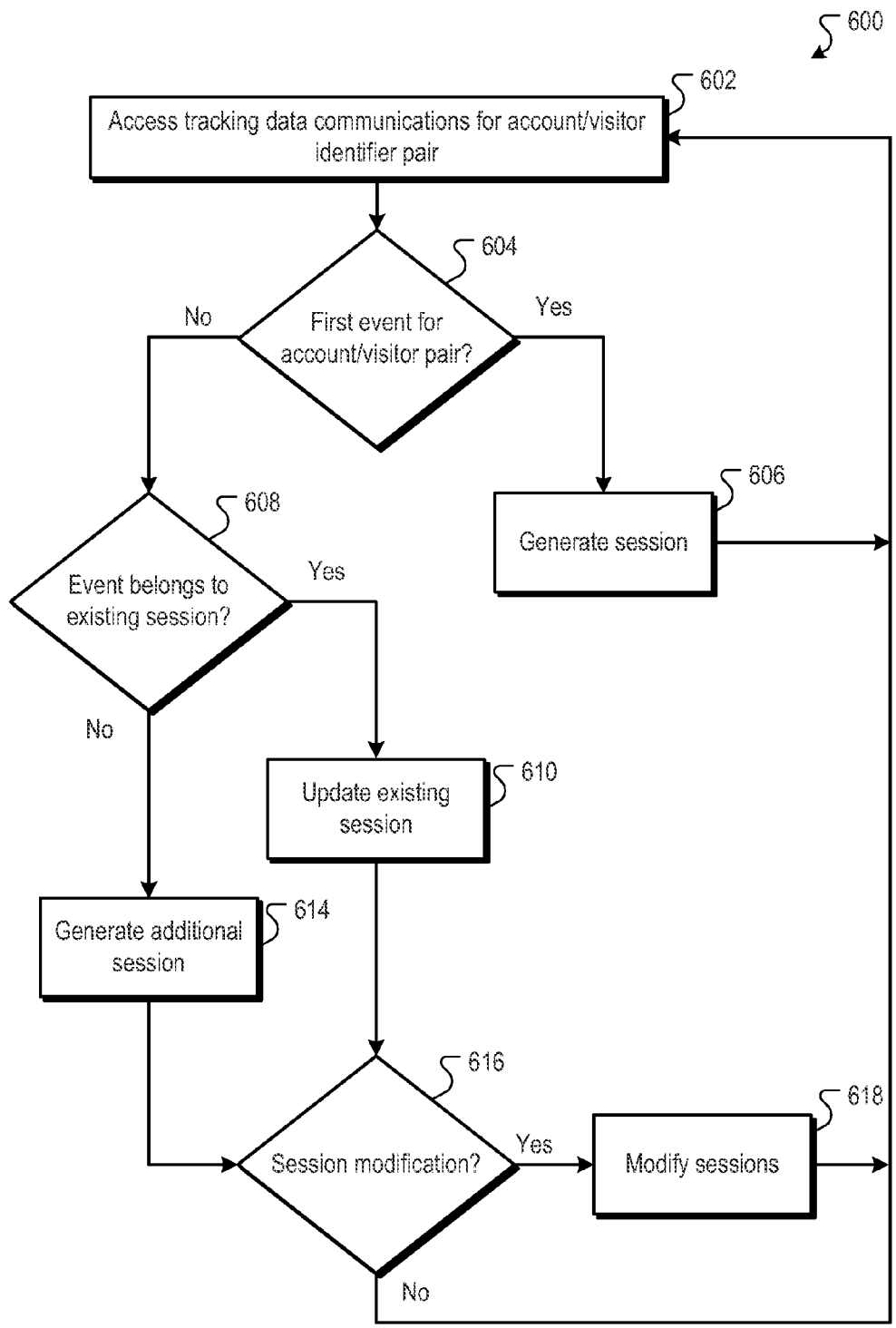
FIG. 6 is a block diagram illustrating the application of an attribution model.

FIG. 6 is a flow diagram of an example process 600 of identifying sessions from disambiguated event statistics. The process 600 is performed in the analytics data processing system 110 that includes a sessionizer engine 130, and can be performed multiple times during an analytics period.

Tracking data for account/visitor identifier pair is accessed (602). For example, the sessionizer 130 accesses the logs 120 that store the tracking data communications and orders them according to their account and visitor identifier pairs. The tracking data communications that are accessed to be processed can be all the tracking data stored in the logs 120, or can be a proper subset of the tracking data communication stored in the logs as determined by the last processing time of the tracking data in the logs 120 and the times at which the tracking data communications were received and/or the event times of the tracking data communications relative to the last processing time.

The sessionizer 130 determines if the event statistics for the account and visitor identifier pair are the first event statistics for that pair (604). For example, the event statistics for the earliest event time (e.g., the first "last visit" time) are identified as the first event for that account visitor pair. If the event statistics for the account and visitor/identifier pair are the first event statistics for that pair, then a new session is generated (606), and event statistics for the next tracking data communication for that account and visitor identifier pair are processed.

Conversely, if the event statistics for the account visitor identifier pair are not the first event statistics for that pair, then the sessionizer 130 determines if the event statistics belong to an existing session (608). For example, if a session criterion defines a session as all events that occur within a 30-minute window of a first event, the event time for the event statistics of the account and visitor identifier pair are compared to the first event times of existing sessions.

If the event statistics belong to an existing session, then the existing session is updated to include the event statistics (610). Conversely, if the event statistics do not belong to any existing sessions, the new session is generated (614).

The sessionizer 130 determines if, as a result of updating an existing session or generating additional session, any sessions should be modified (616). If sessions are determined to be modified, then the sessionizer 130 modifies the sessions (618). For example, if an additional session is generated, and the first event of a subsequent session is within 30 minutes of the event of the additional session that was generated, then the subsequent session can be merged into the new session.

Additionally, as a result of merging sessions, other sessions may need to be split or created. For example, assume a session criterion defines a session as all events that occur within a 30-minute window of a first event. Two events occurring at times 25 minutes and 32 minutes have been previously identified and grouped into a session that begins at time 25 minutes. However, if a new event at time 1 minute is identified for that account and visitor identifier pair, then a new session is generated beginning at time one minute. This new session will also include the event that occurs at time 25 minutes. The new session, however, would not include the event that occurs at times 32 minutes, as the event at 32 minutes is outside of the 30-minute time window measured relative to the first event at time 1 minute. Accordingly, the event at time 32 minutes would be removed from the session and would constitute the beginning of a new session that begins at time 32 minutes.

The example process 600 can be modified to incorporate other session identification and modification logic, depending on the criteria that define a session.

4.0 Attribution Model

Figure 7:
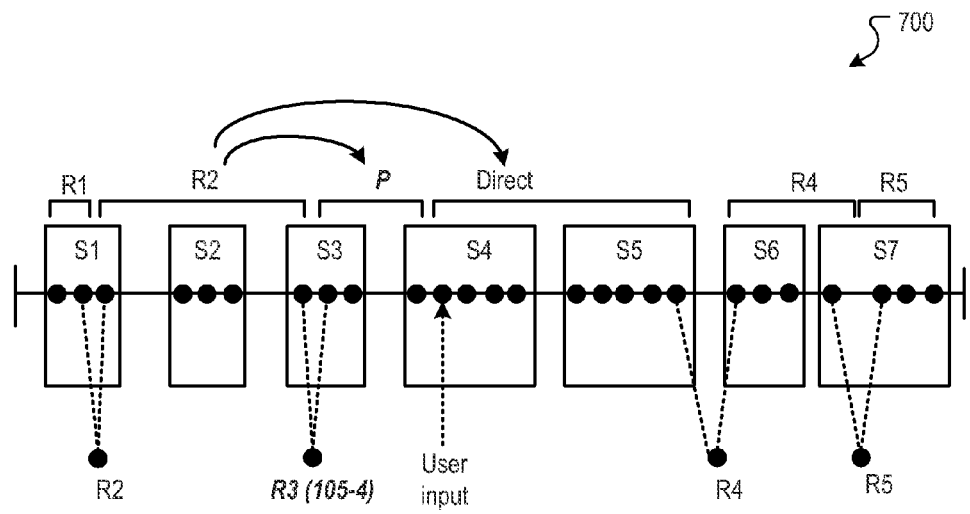
FIG. 7 is a flow diagram of an example process of identifying sessions from disambiguated event statistics.

FIG. 7 is a block diagram 700 illustrating the application of an attribution model. An attribution model is used to attribute visits to referrers and campaigns. Due to the coupling of event statistics, the referrer and campaign data may be ambiguous with respect to particular events. Thus, the sessionizer 130 can implement an attribution model that attributes events to referrals and campaigns.

In the example model of FIG. 7, for an account and visitor identifier pair, the tracking data communication will neither define, propagate, nor inherit referred data, session data, and campaign data for successive events of a different account and visitor identifier pair. Additionally, for each account and visitor identifier pair, each tracking data communication will inherit the referrer data and campaign data of each previous event, unless the referrer data specifies a hostname that is different from the hostname of the sub-property, i.e., different from the hostname of the property that includes the sub-properties.

The horizontal axis represents a portion of an analytics period for which seven sessions S1-S7 are identified, and each dot on the axis represents event statistics corresponding to a single account and visitor identifier at respective times on the axis. For example, the dots along the axis can represent events corresponding to user actions for particular user on the web page 105-3.

For the first session S1, the first tracking data communication includes a referrer data specifying R1, and is determined to be a valid referrer as this is the visitor's first visit. The second tracking data communication results from the visitor taking an action on the web page associated with the account identifier for the accounting visitor identifier pair, e.g., reloading the page or clicking on a video. Accordingly, the referrer data for the first tracking data communication is propagated to the second tracking data communication.

Thereafter, the visitor leaves the web page associated with the account identifier and visits other web pages. At some point in time within the first session, the visitor clicks on a link or an advertisement on another web page addressed by the resource locator R2, and returns to the web page associated with the account identifier and bookmarks the web page. Accordingly, the referrer data R2 is used for the third tracking data communication.

For the second session, the visitor does not take any actions that that require a change to the referrer data. For example, the fourth tracking data communication may be a result of the user selecting the bookmark to the web page. Thus, the referrer data R2 is propagated to the fourth, fifth, sixth and seventh tracking data communications.

For the eighth tracking data communication, the visitor may have visited another sub-property within a property having the same domain name, e.g., web page 105-4, which is specified by the referrer data R3. As this referrer data is associated with a different account identifier pair within the web site 104-2, the referrer data is not used. Instead, the referrer data from the last tracking data communication is propagated to the current tracking data communication. In this case, the referred data R2 is used.

During the fourth session S4, the user types in the URL of the web page 105-3. As this is a direct referrer, the referrer data is not used. Instead, the referrer data from the last tracking data communication is propagated to the current tracking data communication. In this case, the referred data R2 is used.

At the end of the fifth session, the visitor visits a first external web site hosted by a host having a domain name that is different from the domain name of the web site 104-2. While visiting that web site, the user selects a link or an advertisement that refers back to the web page 105-3. Accordingly, the referrer data R4, specifying the web page at the first external web site, is used. The next three tracking data communications corresponding to the account and visitor identifier pair are generated by actions that do not require an update of the referrer data (e.g., reloads of the web page 105-3, or selections on the web page 105-3, etc.), and thus the referrer data R4 are propagated to the next three tracking data communications.

During the seventh session, the visitor visits a second external web site hosted by a host having a domain name that is different from the domain name of the web site 104-2. While visiting that web site, the user selects a link or an advertisement that refers back to the web page 105-3. Accordingly, the referrer data R5, specifying the web page at the first external web site, is used. The next two tracking data communications corresponding to the accounting visitor identifier pair are generated by actions that do not require an update of the referrer data and thus the referrer data R5 are propagated to the next two tracking data communications.

Figure 8:
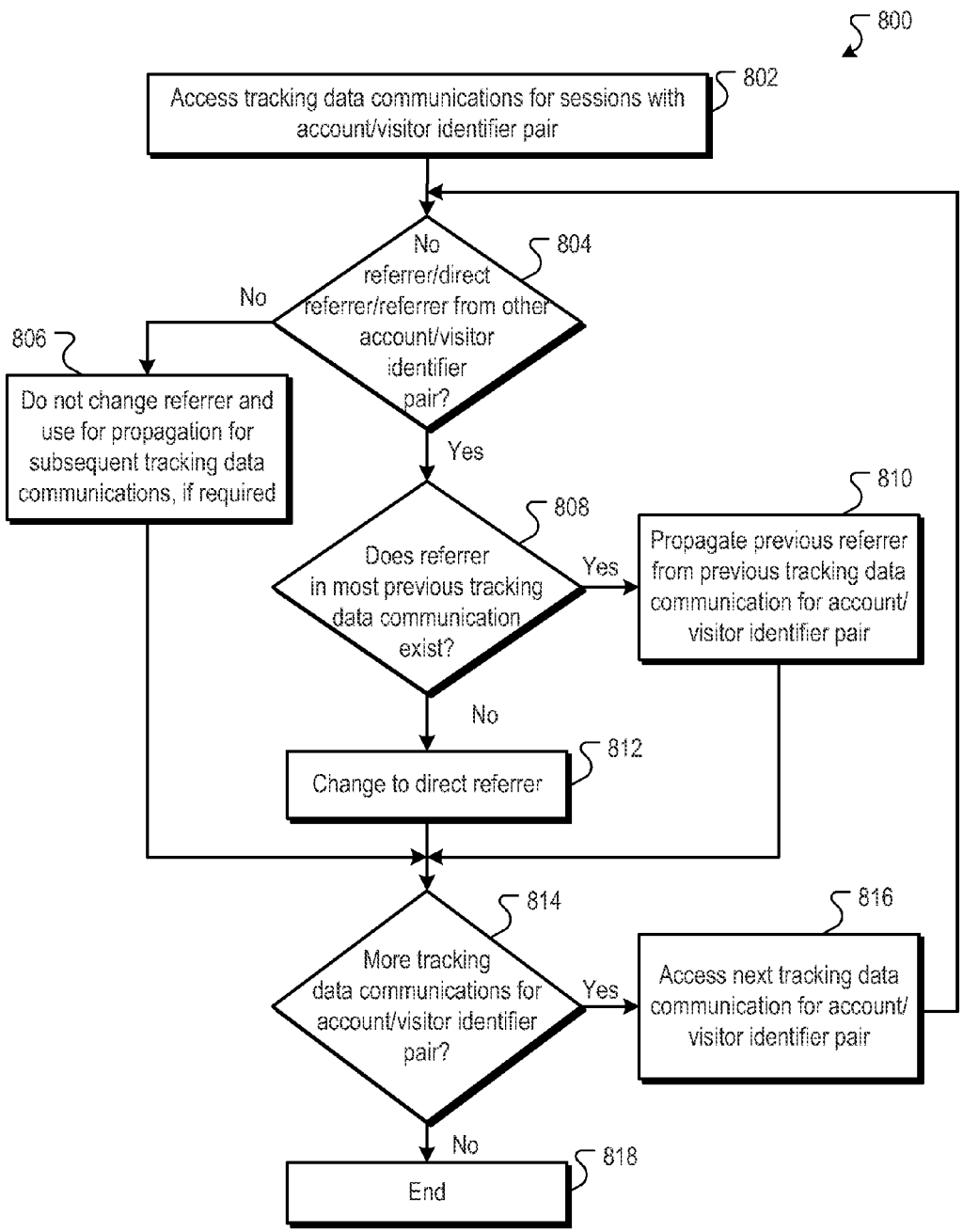
FIG. 8 is a flow diagram of an example process of referral attribution.

FIG. 8 is a flow diagram of an example process 800 of referral attribution. The process 800 is performed in the analytics data processing system 110 that includes a sessionizer engine 130, and can be performed multiple times during an analytics period. In some implementations, the process 800 can be performed after or concurrently with the process 600.

Tracking data for account/visitor identifier pair is accessed (802). For example, the sessionizer 130 accesses the logs 120 and sessions data 122 that store the tracking data communications and identified sessions and processes each tracking data communication and the order as determined by the event times associated with each communication. The tracking data communications that are accessed to be processed can be all the tracking data stored in the logs 120, or can be a proper subset of the tracking data communication stored in the logs as determined by the last processing time of the tracking data in the logs 120 and the times at which the tracking data communications were received and/or the event times of the tracking data communications relative to the last processing time.

The sessionizer 130 determines if the tracking data communication does not specify a referrer, or if the referrer is a direct referrer, or if the referrer specified is from events related to other account and visitor identifier pairs (804). The lack of a referrer being specified can occur if the tracking code is configured to only specify a referrer and campaign when the referrer and/or campaign changes from the referrer and campaigns specified by the data stored in the client-side cookies and resulting new referrer data is written to the client-side cookies. Alternatively, the tracking code can also be configured to identify events that are the very first event for a given referrer and/or campaign, e.g., a first page load in response to coming from the referral site. Referrers from events related to other account and visitor identifier pairs can occur if the tracking code is configured to send the referrer and campaign data stored in the client-side cookies for every tracking data communication, or if the user of the device clicked on a link at one sub-property that links to a second sub-property.

If the tracking data communication specifies a referrer other than direct and the referrer is not from events related to other account and visitor identifier pairs, then the referrer is valid for the account and visitor identifier pair of the tracking data communication. It remains unchanged and can be used for propagating to later tracking data communications for that account and visitor identifier pair (806).

Conversely, if the tracking data communication specifies other than a direct referrer and the referrer is from events related to other account and visitor identifier pairs, then the sessionizer 130 determines if a referrer is specified in a most previous tracking data communication for that account and visitor identifier pair (808). For example, the sessionizer 130 will check the tracking data communication that is immediately prior in the event time order to the tracking data communication being processed.

If a referrer in a most previous tracking data communication for that account and visitor identifier pair is identified, then the referrer data from the most previous tracking data communication in the order specified by the event time is propagated to the current tracking data communication being processed (810).

Conversely, if a referrer in a most previous tracking data communication for that account and visitor identifier pair is not specified, then the referrer data for the current tracking data communication is changed to identify a direct referrer (812).

Thereafter, the sessionizer 130 determines if there are additional tracking data communications for the account and visitor identifier pair to be processed (814). If so, the next tracking data communication for the accounting visitor identifier pair is accessed (816), in the process 800 is repeated. Otherwise, the process 800 ends (818).

Returning to FIG. 4, application of the process 800 to the tracking data communications of table 402 results in the propagated referrer and campaign data of table 404.

The same attribution model described above for referred data can also be applied to campaign data. Additionally, different attribution models can be used. For example, propagation of referrer data and/or campaign data can be limited to a maximum number of tracking data communications. Likewise, propagation of referrer data and/or campaign can also be limited to a particular time period, e.g., one week. Similarly, propagation of referrer data and/or campaign data can be stopped when in response to direct referrals, e.g., when a user types in the URL of the web page.

5.0 Disambiguation and Sessionization of Stateless Event Statistics

Figures 9, 10:
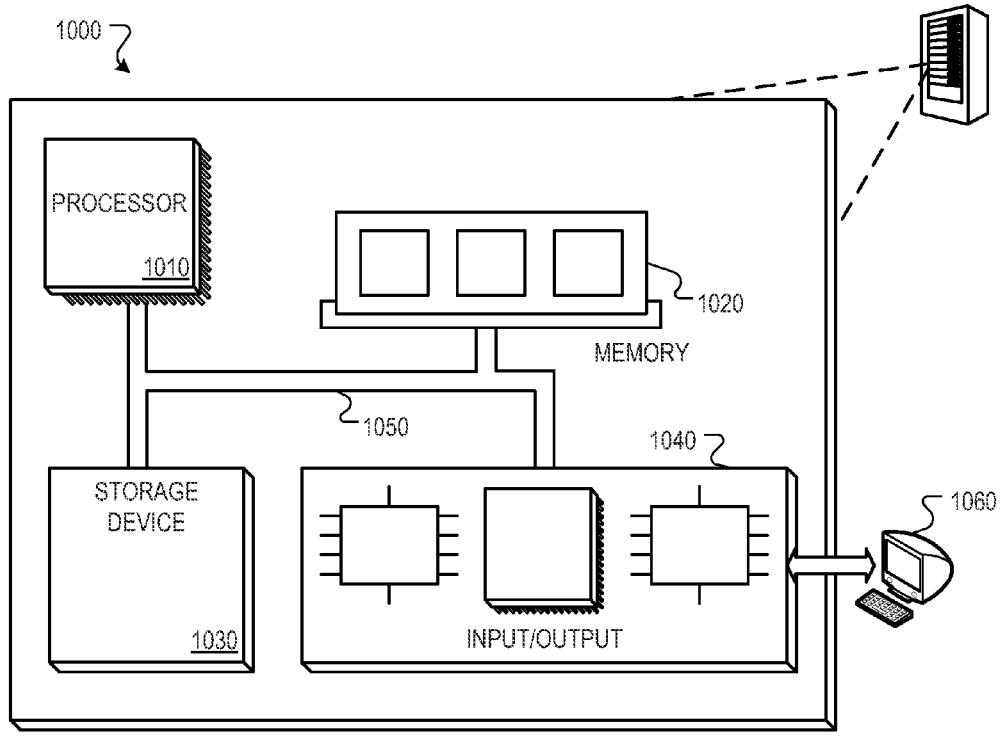
FIG. 9 illustrates state-dependent and sessionized event statistics derived from stateless event statistics.
FIG. 10 is a block diagram of an example computer system that can be utilized to implement the systems and methods described herein.

FIG. 9 illustrates state-dependent and sessionized event statistics derived from stateless event statistics. Table 902 includes six rows of example data communications that were received in response to a unique visitor (i.e., a visitor or user device identified by the visitor identifier "37") to the web pages 105-3 and 105-4.

The actions taken by the visitor are the same as described with respect to FIG. 4. However, the user device did not support the use of cookies, i.e., either the use of cookies was disabled or not supported. Thus, unlike the event statistics in the table 402, which were coupled, the event statistics of table 902 are stateless. Accordingly, in each tracking data communication, the first visit times in the last visit times are equal, and each visit number indicates a first visit.

To resolve this ambiguity for each respective tracking account, the sessionizer 130 orders the event statistics for each account identifier pair by their respective event times. Once the event statistics are ordered, the sessionizer 130 identifies visitor sessions and, optionally, applies an attribution model for proper attribution of referrer and campaigns.

As illustrated in table 904, the events statistics relating to the referrer data, the campaign data, the first visit time, and the number of visits are state-dependent for each sub property, i.e., for each set of web pages 105-3 and 105-4.

To make the first visit times state dependent, the ordered event statistics for each account and visitor identifier pair are searched for the earliest tracking data communication received. The corresponding event time of this tracking data communication is used as the first visit time. For example, for the tracking data communications for the account and visitor identifier pair 3/37, the first event time (i.e., the last visit time or first visit time) is T2. Thus, this time is used for the first visit time for the account and visitor identifier pair 3/37.

To make the number of visits state-dependent, the number of visits are reset and incremented for the ordered event statistics for each account and visitor identifier pair. In the example of FIG. 9, the visitor visited each respective sub-property 105-3 and 105-4 three times.

Once the state-dependent event statistics are derived, the sessionizer 130 can also partition the event statistics of this identifier pair into sessions and apply the attribution modes in the same manner as described above to arrive at the final event statistics shown in table 904.

6.0 Additional Features and Processing Capabilities

In addition to providing the features described above, server side sessionizing also allows the collection and aggregation of event statistics across different domains. For example, the web site 104-3 may have additional web pages hosted by a server with a host name corresponding to the domain name of the web site 104-3. One or more of the web pages 105-3 may include a link to additional web pages provided by the web site 104-3. The actions of visitors taken at the web pages 105-3 can also be aggregated with actions taken by visitors to web pages of the web site 104-3, as both sets of web pages are associated with a tracking account of the publisher of the web site 104-3.

In some implementations, a tracking account can have multiple account identifiers and the event statistics for each account identifier can be presented in separate form and in aggregate form. For example, the publisher of web site 104-3 can have a first account identifier associated with web pages provided by the web site 104-3, and can have a second account identifier for the web pages 105-3. The analytics system 110 can generate analytical reports for the publisher that specify analytical data for the web pages 105-3, for the web pages of the web site 104-3, and aggregate analytical data that are a combination of the analytical data for the web pages 105-3 and the web pages of the web site 104-3.

Likewise, the account identifier for the publisher of the web site 104-2 can be associated with the account identifiers for the web pages 105-3, 105-4 and 105-5 so that aggregate analytical data for the web site 104-2 can be presented to the publisher of that web site. Additionally, the analytics system 110 can be configured to suppress or strip certain analytical data from reports presented for the website 104-2. For example, the effectiveness of an advertising campaign can be determined from events such as conversions and click-throughs. As this is sensitive information, analytical data for the campaigns of publishers 104-3, 104-4 and 104-5 can be stripped from reports for the publisher of the web site 104-2.

7.0 Example Computer System

FIG. 10 is a block diagram of an example computer system 1000 that can be utilized to implement the systems and methods described herein. The architecture of the system 1000 can, for example, be used to implement a computer client, a computer server, or some other computer device.

The system 1000 includes a processor 1010, a memory 1020, a storage device 1030, and an input/output device 1040. Each of the components 1010, 1020, 1030, and 1040 can, for example, be interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 can, for example, include a hard disk device, an optical disk device, or some other large capacity storage device.

The input/output device 1040 provides input/output operations for the system 1000. In one implementation, the input/output device 1040 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 1060.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or one that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving at an analytics data processing apparatus tracking data communications for a single property, the single property including a plurality of sub-properties, each sub-property being one or more respective web pages associated with a respective account identifier identifying a tracking account, each respective account identifier being different from each other respective account identifier, and each tracking data communication including:
      an account identifier identifying a tracking account;
      a visitor identifier identifying a visitor to a sub-property associated with the tracking account;
      an event time; and
      one or more coupled event statistics, the coupled event statistics being event statistics for at least two of the sub-properties aggregated at a single property level that corresponds to the single property and that do not respectively quantify actions taken at the respective sub-properties;
   identifying at the analytics data processing apparatus account identifier and visitor identifier pairs from the account identifiers and visitor identifiers in the tracking data communications; and
   for each account identifier and visitor identifier pair:
      ordering at the analytics data processing apparatus the coupled event statistics by the corresponding event times in the tracking data communications corresponding to the account identifier and visitor identifier pair; and
      deriving decoupled event statistics from the coupled event statistics ordered by the event times, the decoupled event statistics including statistics for only the sub-property associated with the account identifier.

2. The computer-implemented method of claim 1, further comprising, for each account identifier and visitor identifier pair, identifying a plurality of sessions from the decoupled event statistics, each session being an association of decoupled event statistics that meet a session criterion.

3. The computer-implemented method of claim 2, wherein the coupled event statistics include referrer data specifying a referrer in the tracking data communication, and wherein deriving decoupled event statistics comprises:
   decoupling referrer data specifying a first referrer in a first tracking data communication for a first visitor identifier and a first account identifier from a subsequent second tracking data communication for the first visitor identifier and a second account identifier having referrer data specifying the first referrer.

4. The computer-implemented method of claim 2, wherein the coupled event statistics include referrer data specifying a referrer in the tracking data communication, and wherein deriving decoupled event statistics comprises:
   propagating referrer data specifying a first referrer in a first tracking data communication for a first visitor identifier and a first account identifier to a subsequent second tracking data communication for the first visitor identifier and the first account identifier associated with a first session.

5. The computer-implemented method of claim 4, wherein propagating the referrer data comprises propagating the referrer data only in response to determining that the subsequent second tracking data includes referrer data specifying a direct referral to the sub-property associated with the first account identifier.

6. The computer-implemented method of claim 2, wherein the coupled event statistics include campaign data specifying a campaign in the tracking data communication, and wherein deriving decoupled event statistics comprises:
   decoupling campaign data specifying a first campaign in a first tracking data communication for a first visitor identifier and a first account identifier from a subsequent second tracking data communication for the first visitor identifier and a second account identifier having campaign data specifying the first campaign.

7. The computer-implemented method of claim 2, wherein the coupled event statistics include campaign data specifying a campaign in the tracking data communication, and wherein deriving decoupled event statistics comprises:
   propagating campaign data specifying a first campaign in a first tracking data communication for a first visitor identifier and a first account identifier to a subsequent second tracking data communication for the first visitor identifier and the first account identifier associated with a first session.

8. The computer implemented method of claim 2, wherein the session criterion is a predetermined time period.

9. The computer-implemented method of claim 2, further comprising:
   defining, by the analytics data processing apparatus, a plurality of processing time windows, and each processing time window defining a start time, an end time, an intra-processing time that occurs between the start time and end time of the processing time window, and a post-processing time that occurs after the end time of the processing time window;
   for each tracking data communication received after a last processing time, the last processing time being one of the intra-processing times or the end time, comparing the event time to the last processing time; and
   repeating the ordering of the coupled event statistics, the deriving of the decoupled event statistics, and the identifying the plurality of sessions for the tracking data communications having event times that occur after the last processing time at one of the intra-processing times, end time, or the post-processing time that is later than the last processing time.

10. The computer-implemented method of claim 2, further comprising:
   tagging each tracking data communication with a time at which it is received at the analytics data processing apparatus;
   defining, by the analytics data processing apparatus, a plurality of processing time windows, and each processing time window defining a start time, an end time, an intra-processing time that occurs between the start time and end time of the processing time window, and a post-processing time that occurs after the end time of the processing time window; and
   for each tracking data communication received after a last processing time, the last processing time being one of the intra-processing times or the end time, repeating the ordering of the coupled event statistics, the deriving of the decoupled event statistics, and the identifying the plurality of sessions for the tracking data communications at one of the intra-processing times, end time, or the post-processing time that is later than the last processing time.

11. The computer-implemented method of claim 2, further comprising, for each accounting identifier:
aggregating the decoupled event statistics into aggregated event statistics for each account identifier and visitor identifier pair that includes the account identifier; and
storing the aggregated event statistics for access by a user of the tracking account identified by the account identifier.

12. The computer-implemented method of claim 1, wherein the single property is defined by a web site, and wherein each sub-property is defined by a corresponding web page hosted on the web site.

13. The computer-implemented method of claim 1, wherein the single property is defined by a web page, and wherein each sub-property is defined by corresponding gadgets embedded in the web page.

14. The computer-implemented method of claim 1, wherein the single property is defined by a cookie space, the cookie space defined by all resources that cause a browser to store a cookie that is common to each of the resources.

15. A system, comprising:
an analytics data processing apparatus, the analytics data processing apparatus being one or more computers, and having accesses to a data store storing in a non-transitory computer-readable medium:
tracking data communications received for a single property, the single property including a plurality of sub-properties, each sub-property being one or more respective web pages associated with a respective account identifier identifying a tracking account, each respective account identifier being different from each other respective account identifier, and each tracking data communication including:
an account identifier identifying a tracking account;
a visitor identifier identifying a visitor to a sub-property associated with the tracking account;
an event time; and
one or more coupled event statistics, the coupled event statistics being event statistics for at least two of the sub-properties aggregated at a single property level that corresponds to the single property and that do not respectively quantify actions taken at the respective sub-properties;
a sessionizer engine stored in a non-transitory computer-readable medium, the sessionizer engine including instructions executable by the analytics data processing apparatus and upon such execution cause the analytics data processing apparatus to perform operations comprising:
identifying account identifier and visitor identifier pairs from the account identifiers and visitor identifiers in the tracking data communications; and
for each account identifier and visitor identifier pair:
ordering the coupled event statistics by the corresponding event times in the tracking data communications corresponding to the account identifier and visitor identifier pair;
deriving decoupled event statistics from the coupled event statistics ordered by the event times, the decoupled event statistics including statistics for only the sub-property associated with the account identifier; and
storing associations of the decoupled event statistics and the account identifier and visitor identifier pairs in the data store.

16. The system of claim 15, wherein the sessionizer engine, upon execution, causes the analytics data processing apparatus to perform operations comprising: for each account identifier and visitor identifier pair, identifying a plurality of sessions from the decoupled event statistics, each session being an association of decoupled event statistics that meet a session criterion.

17. The system of claim 16, wherein the coupled event statistics include referrer data specifying a referrer in the tracking data communication, and wherein deriving decoupled event statistics comprises the operations of:
decoupling referrer data specifying a first referrer in a first tracking data communication for a first visitor identifier and a first account identifier from a subsequent second tracking data communication for the first visitor identifier and a second account identifier having referrer data specifying the first referrer.

18. The system of claim 16, wherein the coupled event statistics include referrer data specifying a referrer in the tracking data communication, and wherein deriving decoupled event statistics comprises:
propagating referrer data specifying a first referrer in a first tracking data communication for a first visitor identifier and a first account identifier to a subsequent second tracking data communication for the first visitor identifier and the first account identifier associated with a first session and only in response to determining that the subsequent second tracking data includes referrer data specifying a direct referral to the sub-property associated with the first account identifier.

19. The system of claim 16, wherein the coupled event statistics include campaign data specifying a campaign in the tracking data communication, and wherein deriving decoupled event statistics comprises:
decoupling campaign data specifying a first campaign in a first tracking data communication for a first visitor identifier and a first account identifier from a subsequent second tracking data communication for the first visitor identifier and a second account identifier having campaign data specifying the first campaign.

20. The system of claim 16, wherein the sessionizer engine, upon execution, causes the analytics data processing apparatus to perform operations comprising:
defining a plurality of processing time windows, and each processing time window defining a start time, an end time, an intra-processing time that occurs between the start time and end time of the processing time window, and a post-processing time that occurs after the end time of the processing time window; and
for each tracking data communication:
comparing the event time to the processing time windows; and
grouping the tracking data communications in corresponding time windows based on the comparison; and
repeating the ordering of the coupled event statistics, the deriving the decoupled event statistics, and the identifying the plurality of sessions at the occurrence of each intra-processing time, end time, and post-processing time of each time window.

21. A system, comprising:
a data store storing in a non-transitory computer-readable medium:

tracking data communications received for a single property, the single property including a plurality of sub-properties, each sub-property being one or more respective web pages associated with a respective account identifier identifying a tracking account, each respective account identifier being different from each other respective account identifier, and each tracking data communication including:
  an account identifier identifying a tracking account;
  a visitor identifier identifying a visitor to a sub-property associated with the tracking account;
  an event time; and
  one or more coupled event statistics, the coupled event statistics being event statistics for at least two of the sub-properties aggregated at a single property level that corresponds to the single property and that do not respectively quantify actions taken at the respective sub-properties; and
means for sessionizing the coupled event statistics into decoupled event statistics according to account identifier and visitor identifier pairs, the decoupled event statistics including statistics for only the sub-property associated with the account identifier.

22. A computer-implemented method, comprising:
receiving at an analytics data processing apparatus tracking data communications for properties associated respective account identifiers identifying tracking accounts, each property being one or more respective web pages, each respective account identifier being different from each other respective account identifier, and each tracking data communication including:
  an account identifier identifying a tracking account;
  a visitor identifier identifying a visitor to the property associated with the tracking account;
  an event time; and
  one or more stateless event statistics, the stateless event statistics being event statistics that are independent of prior event statistics in prior tracking data communications; and
wherein the independence of prior event statistics for each tracking data communication is established by a first visit time and a last visit time for each tracking data communication being equal;
identifying at the analytics data processing apparatus account identifier and visitor identifier pairs from the account identifiers and visitor identifiers in the tracking data communications; and
for each account identifier and visitor identifier pair:
  ordering at the analytics data processing apparatus the stateless event statistics by the corresponding event times in the tracking data communications corresponding to the account identifier and visitor identifier pair; and
  deriving state-dependent event statistics from the stateless event statistics ordered by the event times, the state-dependent event statistics including statistics for only the property associated with the account identifier.

23. The computer-implemented method of claim 22, further comprising, for each account identifier and visitor identifier pair, identifying a plurality of sessions from the state-dependent event statistics, each session being an association of state-dependent event statistics that meet a session criterion.

24. The computer-implemented method of claim 23, wherein the stateless event statistics include referrer data specifying a referrer in the tracking data communication, and wherein deriving state-dependent event statistics comprises:
  propagating referrer data specifying a first referrer in a first tracking data communication for a first visitor identifier and a first account identifier to a subsequent second tracking data communication for the first visitor identifier and the first account identifier associated with a first session.

25. The computer-implemented method of claim 24, wherein propagating the referrer data comprises propagating the referrer data only in response to determining that the subsequent second tracking data includes referrer data specifying a direct referral to the property associated with the first account identifier.

* * * * *